US007674182B2

(12) United States Patent
Gauselmann

(10) Patent No.: US 7,674,182 B2
(45) Date of Patent: Mar. 9, 2010

(54) PROGRESSIVE JACKPOT GAMING SYSTEM

(75) Inventor: Michael Gauselmann, Espelkamp (DE)

(73) Assignee: Atronic International GmbH, Lübbecke (DE)

( * ) Notice: Subject to any disclaimer, the term of this patent is extended or adjusted under 35 U.S.C. 154(b) by 750 days.

(21) Appl. No.: 10/226,975

(22) Filed: Aug. 22, 2002

(65) Prior Publication Data

US 2004/0038741 A1 Feb. 26, 2004

(51) Int. Cl.
*A63F 13/12* (2006.01)

(52) U.S. Cl. ............................ 463/42; 463/17; 463/20; 463/22; 463/27; 273/138.1; 273/139; 713/176; 902/23

(58) Field of Classification Search ............. 463/16–23, 463/25–33, 39–43, 47; 273/138.1, 139, 138.2, 273/141 A, 454–456, 460; 709/203–207, 709/FOR. 113; 705/14; 713/1, 100, 150, 713/155, 170, 176, 182–184, 186–189, 300, 713/375, 400, 500, 600; 902/2–3, 23, 38, 902/40
See application file for complete search history.

(56) References Cited

U.S. PATENT DOCUMENTS 4,095,795 A 6/1978 Saxton et al. ........... 273/143 R
4,373,726 A * 2/1983 Churchill et al. .............. 463/19
4,573,681 A * 3/1986 Okada ......................... 463/21
4,669,730 A * 6/1987 Small .......................... 463/17
4,764,666 A * 8/1988 Bergeron ...................... 463/25
4,837,728 A 6/1989 Barrie et al. ................ 364/412
4,858,932 A * 8/1989 Keane ......................... 463/21
4,882,473 A * 11/1989 Bergeron et al. .............. 463/25
5,080,364 A * 1/1992 Seidman ...................... 463/17
5,265,874 A * 11/1993 Dickinson et al. ............. 463/25
5,417,424 A * 5/1995 Snowden et al. .............. 463/18
5,611,730 A 3/1997 Weiss .......................... 463/20
5,655,961 A * 8/1997 Acres et al. .................... 463/27
5,674,128 A * 10/1997 Holch et al. .................. 463/42
5,766,076 A * 6/1998 Pease et al. ................... 463/27
5,833,538 A * 11/1998 Weiss .......................... 463/21

(Continued)

FOREIGN PATENT DOCUMENTS

DE 199 27 131 A1 6/2000

(Continued)

OTHER PUBLICATIONS

Translation for German Publication No. DE 199 27 132 A1, 3 pages.

(Continued)

*Primary Examiner*—Peter DungBa Vo
*Assistant Examiner*—Arthur O. Hall
(74) *Attorney, Agent, or Firm*—Patent Law Group LLP; Brian D. Ogonowsky

(57) ABSTRACT

A progressive jackpot system for a gaming network is described wherein the accumulation of the jackpot is based upon any of a number of factors, and the winning of the jackpot is based on any of a number of factors. In one embodiment, the winning of the jackpot may be by any player using a player ID card or a cash-less card to play a gaming machine. The determination of a winner of the jackpot may be based on a random selection of a player's ID code (or cash-less card code) by a network computer.

23 Claims, 2 Drawing Sheets

U.S. PATENT DOCUMENTS

| | | | | | |
|---|---|---|---|---|---|
| 5,855,515 | A * | 1/1999 | Pease et al. | ......... | 463/27 |
| 5,917,725 | A * | 6/1999 | Thacher et al. | ......... | 700/91 |
| 6,010,404 | A * | 1/2000 | Walker et al. | ......... | 463/21 |
| 6,012,983 | A * | 1/2000 | Walker et al. | ......... | 463/20 |
| 6,015,347 | A * | 1/2000 | Maahs et al. | ......... | 463/27 |
| 6,068,552 | A * | 5/2000 | Walker et al. | ......... | 463/21 |
| 6,077,163 | A * | 6/2000 | Walker et al. | ......... | 463/26 |
| 6,089,980 | A * | 7/2000 | Gauselmann | ......... | 463/27 |
| 6,089,982 | A * | 7/2000 | Holch et al. | ......... | 463/42 |
| 6,110,043 | A * | 8/2000 | Olsen | ......... | 463/27 |
| 6,146,270 | A | 11/2000 | Huard et al. | | |
| 6,186,895 | B1 * | 2/2001 | Oliver | ......... | 463/25 |
| 6,210,275 | B1 * | 4/2001 | Olsen | ......... | 463/16 |
| 6,224,482 | B1 | 5/2001 | Bennett | ......... | 463/20 |
| 6,244,957 | B1 * | 6/2001 | Walker et al. | ......... | 463/20 |
| 6,254,483 | B1 * | 7/2001 | Acres | ......... | 463/26 |
| 6,257,981 | B1 | 7/2001 | Acres et al. | ......... | 463/26 |
| 6,267,677 | B1 * | 7/2001 | Tajiri et al. | ......... | 463/43 |
| 6,280,328 | B1 * | 8/2001 | Holch et al. | ......... | 463/42 |
| 6,319,125 | B1 * | 11/2001 | Acres | ......... | 463/25 |
| 6,435,968 | B1 * | 8/2002 | Torango | ......... | 463/27 |
| 6,454,650 | B1 * | 9/2002 | Aronin | ......... | 463/17 |
| 6,692,360 | B2 * | 2/2004 | Kusuda et al. | ......... | 463/42 |
| 6,743,102 | B1 * | 6/2004 | Fiechter et al. | ......... | 463/42 |
| 6,786,824 | B2 * | 9/2004 | Cannon | ......... | 463/42 |
| 6,800,027 | B2 * | 10/2004 | Giobbi et al. | ......... | 463/24 |
| 6,852,031 | B1 * | 2/2005 | Rowe | ......... | 463/29 |
| 6,869,361 | B2 * | 3/2005 | Sharpless et al. | ......... | 463/25 |
| 7,029,395 | B1 * | 4/2006 | Baerlocher | ......... | 463/20 |
| 7,169,041 | B2 * | 1/2007 | Tessmer et al. | ......... | 463/16 |
| 2001/0036857 | A1 * | 11/2001 | Mothwurf et al. | ......... | 463/25 |
| 2002/0034975 | A1 * | 3/2002 | Walker et al. | ......... | 463/21 |
| 2002/0055381 | A1 * | 5/2002 | Tarantino | ......... | 463/20 |
| 2002/0147040 | A1 * | 10/2002 | Walker et al. | ......... | 463/25 |
| 2003/0060261 | A1 * | 3/2003 | Katz et al. | ......... | 463/17 |
| 2003/0114211 | A1 * | 6/2003 | White | ......... | 463/17 |

FOREIGN PATENT DOCUMENTS

| | | |
|---|---|---|
| DE | 100 04 150 A1 | 8/2001 |
| WO | WO 96/11730 | 4/1996 |

OTHER PUBLICATIONS

Translation for German Publication No. DE 100 04 150 A1, 2 pages.

* cited by examiner

PROGRESSIVE JACKPOT GAMING SYSTEM

FIELD OF THE INVENTION

This invention relates to gaming machines and, in particular, to progressive jackpots for a network of gaming machines.

BACKGROUND

It is known to provide a system of interconnected gaming machines, such as reel-type slot machines, where a percentage of the wagers are accumulated in a single jackpot. Either a central display or a display on each machine is provided so as to display a potentially very large jackpot in an attempt to motivate players to play the gaming machines within the network. A percentage of each bet increments the jackpot a corresponding amount.

The symbol combination that gives rise to the jackpot is predetermined, and the player strives to obtain the well-advertised symbol combination to win the jackpot. Since the chances of obtaining the combination are extremely small, many potential players are not lured by the jackpot amount to play the gaming machines unless the jackpot amount is very high.

In some jurisdictions, it is illegal for any jackpot to be accumulated based upon the wagers made in gaming machines that are outside the jurisdiction, such as outside the state.

Accordingly, for these and other reasons, a new gaming network is desirable where jackpots are won by other than a predetermined jackpot symbol combination and/or the progressive jackpot is accumulated based on other than a direct percentage of the wagers made on gaming machines within the network.

In modern casinos, a player may be issued a player identification (ID) card, which is typically a plastic or paper card having a magnetic strip containing information about the player and, optionally, a monetary amount. The player ID card is inserted into a gaming machine to initiate play, and data from the card is processed in the casino's central computer. It is beneficial to the casino to have players use such cards, since valuable information is gained by tracking the players' use of the gaming machines. Accordingly, a new gaming network is desirable to encourage players to obtain and use a player ID card.

SUMMARY

A progressive jackpot system for a gaming network is described wherein the accumulation of the jackpot is based upon any of a number of factors, and the winning of the jackpot is based on any of a number of factors.

In one embodiment, the accumulation of the jackpot is not based on a direct percentage of every wager made in a gaming machine within a network but, instead, the jackpot is accumulated based on other factors such as contributions by any casino connected to the network. Such a contribution may be based on revenues from gaming machines within the network, or a fixed amount per unit time, or on other factors. Therefore, a progressive jackpot system may be used in jurisdictions that do not allow a percentage of wagers in gaming machines in other jurisdiction to be added to a common jackpot.

The winning of a progressive jackpot may be based upon either a random time event, a variable symbol combination that changes periodically and is advertised to the players, or when a certain jackpot value (a fixed value or a value based upon a random selection) is reached. Other criteria for determining a win by a player may also be used, such as the player obtaining a standard jackpot symbol combination.

Another progressive jackpot system is described wherein the winning of the jackpot is decided based on the player's identification code issued to the player by the casino. The jackpot may be awarded based on the ID code whether or not the player is actively playing a gaming machine. In one embodiment, the determination of a winner of the jackpot is based on a random selection of a player's ID number for a certain period of time, whereby, if the selected player plays a game using her ID card within that period, the player wins the jackpot. The criteria for winning the jackpot may also require the player to achieve a certain outcome in a gaming machine. In another embodiment, the selected player ID code is publicly displayed, and the player collects the jackpot at a cashier's kiosk.

DETAILED DESCRIPTION

Figure 1:
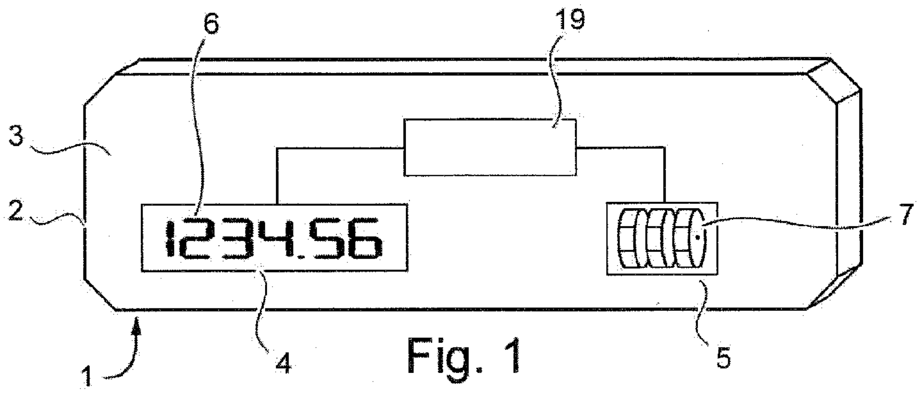
FIG. 1 illustrates a jackpot display for viewing by players who are playing gaming devices within a network.

FIG. 1 is one embodiment of a jackpot display 1 that is viewable by all players playing gaming machines connected to a network in a casino. There may be multiple jackpot displays in the casino displaying the same information. Similar jackpot displays are viewable by players playing gaming machines in other casinos if a common jackpot is used for the casinos.

The jackpot display 1 has a housing 2 with a front side 3 for viewing by the players. In display window 4, there is shown the progressive jackpot amount. Although a six-digit display 6 is shown, the display may be a ten-digit display for displaying jackpot amounts in excess of ten million dollars.

A window 5, in one embodiment, displays a set of rotatable reels 7, or displays symbol combinations on a video screen. In such an embodiment, the symbols displayed in window 5 are randomly (or pseudo-randomly) selected by the gaming system so that, if one of the gaming machines in the network obtains the symbol combination identified in window 5, a jackpot will be awarded by that gaming machine.

A control device 19, such as a microprocessor, controls display 6 and the random display of the reels 7. Control device 19 may receive information from a processor not incorporated in the display 1. Communication with the control device 19 may be with wires, or there may be a wireless connection. Control device 19 can be external to the display 1.

Figure 2:
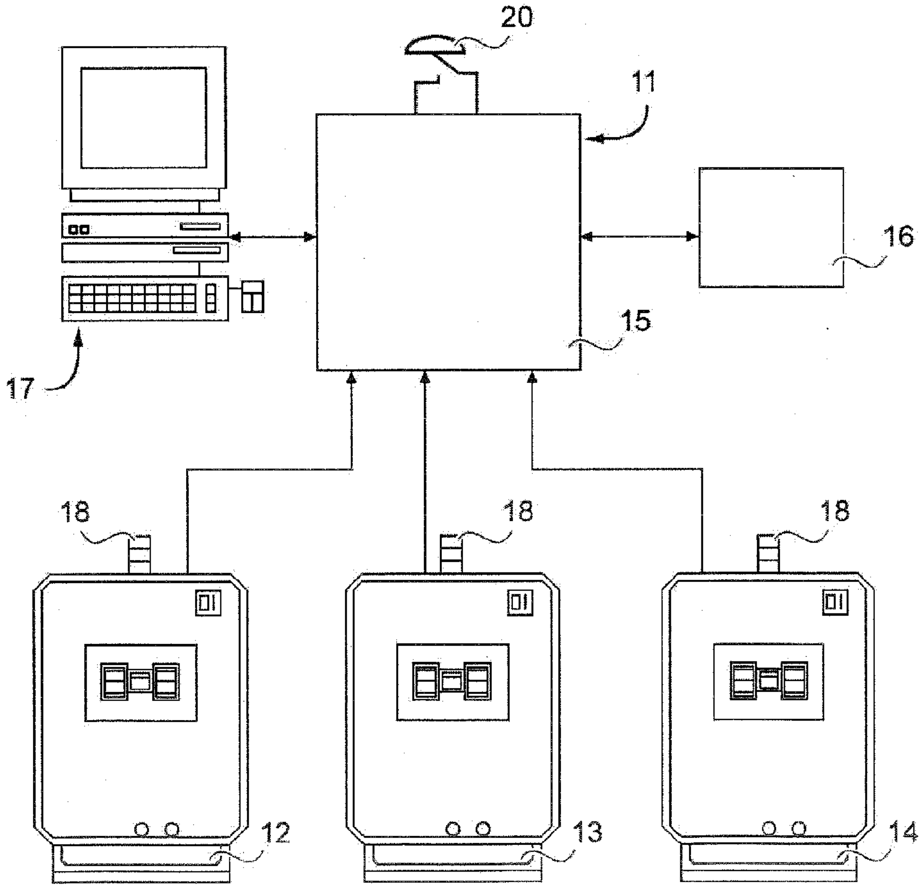
FIG. 2 illustrates one embodiment of the gaming network coupled to the jackpot display of FIG. 1.

FIG. 2 illustrates one example of a gaming network located in a casino, where one of the players may win the jackpot displayed by the jackpot display 1. Other networks may be in other casinos, and these networks may either have their own independent jackpots displayed, or any machine in the various casinos' networks may win a common jackpot displayed by jackpot display devices in each of the casinos. The latter case results in larger jackpots.

The network of FIG. 2 comprises a number of gaming machines 12, 13, and 14 of any type, such as those that rotate reels or simulate the rotating of reels on a video display. These gaming machines are connected to a conventional multiplexer/demultiplexer (MUX) 15 that serves to communicate with all the gaming machines in the network. A central server computer 17 runs a computer program that controls the gaming machine network. The central server computer 17 may also control the jackpot display 1. A suitable computer program for controlling the network would be understood by those skilled in the art.

A random selector 16 for selecting the combination of symbols on reels 7 in the jackpot display 1, or for selecting some other random event, time, or person, is shown as a separate functional block, but the random selector 16 may be part of the computer program run by computer 17. A switch 20 on multiplexer 15 illustrates the function (typically performed by the computer program) of activating the random selector 16. The random selector 16 may be independent of the gaming system if the jackpot is awarded to individuals not necessarily playing a gaming machine. Additional details of various criteria for being awarded a jackpot are described below.

In one embodiment, the communication link between the gaming machines and between the MUX 15 and the jackpot display 1 is a serial RS422 communication link, and the gaming machines 12-14 are connected in a star pattern. When a jackpot is won by a certain gaming machine, a lamp 18 may be activated accompanied by an alarm so that an operator may pay the player.

Additional details of electronic gaming machines and gaming machine networks, including cash-less gaming machine networks, are described in U.S. Pat. Nos. 4,095,795; 4,837,728; 6,224,482; 5,611,730; 6,280,328; and 6,257,981, all incorporated herein by reference.

The system thus described can operate in any of a variety of ways. The conventional way is for the displayed jackpot amount to be awarded to the player whose gaming machine achieves an outcome corresponding to a predetermined jackpot combination, such as three of the same special jackpot symbols. However, such a conventional method has a number of drawbacks. For example, a typical jackpot does not sufficiently motivate players to continue playing the gaming machines in the network, since obtaining the jackpot symbol combination is extremely unlikely. Additionally, since the odds of obtaining the jackpot combination are constant, while the jackpot can be any amount, the players may only be enticed to play the gaming machines when the jackpot is high.

In one embodiment, the jackpot is paid out for other than the standard jackpot combination of symbols. Additionally, the jackpot amount may increase independently of the amount of wagering made in the gaming machines connected to the network. In this way, if players are not playing the gaming machines, the jackpot will still continue to increase so that the players are enticed to play the gaming machines as the jackpot rises. This is particularly effective at times when the casino is not busy. Thus, the jackpot may rise based upon predetermined time periods, based upon revenues from the casino, based upon the number of plays by the various players playing the gaming machines in the network, based upon revenues from gaming machines not in the network, or based upon any other factor. In one embodiment, the random symbol combinations generated by reels 7 in the jackpot display 1 are assigned various values, and these values are added to the jackpot upon each spin of the reels 7.

By the jackpot not necessarily being a percentage of the wagers in the gaming devices, multiple gaming networks in different casinos can share a common jackpot. In such a case, jackpots quickly increase after a jackpot has been awarded. Additionally, the casinos can better control their revenues since the jackpot is independent of the activity or revenue of the gaming machines in the network.

Multiple casinos can also combine their networks. Since the accumulation of the jackpot amount is not necessarily based on the play of a gaming machine, the gaming machine networks need only communicate regarding the award of the jackpot.

The determination of which player wins the jackpot may include any of the following events: 1) a random time and day as determined by computer 17 or control device 19 such that the next player that obtains any game outcome after this random time wins the jackpot; 2) after a random number of plays of the gaming machines in the network, where the random number is selected by either computer 17 or control device 19; 3) when an outcome of any of the gaming machines matches that of the combination of symbols on the reels 7 in the jackpot display 1, where the combination is periodically and randomly selected; 4) after the jackpot has reached a certain value, where the certain value may be randomly determined by computer 17 or control device 19; 5) when a gaming machine is randomly selected by the network to win the jackpot by, for example, being controlled by the network computer to display the jackpot symbol combination; or 6) if a randomly selected player ID number (or ticket number) is used to initiate play in a gaming machine, as will be described later.

By selecting the jackpot based upon random times, the operator of the jackpot system can set the number of jackpots triggered during a certain timeframe (e.g., each month) so as to control the maximum winning amount and the number of wins in the selectable timeframe to optimize the players' interests. With careful planning, the jackpot amount can be made optimal to entice additional players to play the gaming machines, and the frequency of winning can be relatively high to further entice players to play the gaming machines. For example, if a jackpot is awarded based upon the number of times the gaming machines in the network have been played, the casino may not want to use this trigger during periods of high use, since the awarding of a jackpot would be too frequent. Instead, the casino owner may decide to award the jackpot at random times or based upon a certain symbol combination displayed in window 7, where the symbol combination has a known likelihood of winning that is commensurate with the desired average time period between jackpot wins.

If the casino owner wishes to periodically vary the criteria for winning the jackpot, the casino owner may make this known by displaying (using the jackpot display 1) to the players that the jackpot will be awarded at a random time, or based on a random number of plays, etc.

If the jackpot value displayed in window 4 is to be awarded for the symbol combination displayed in window 5, the first gaming machine to obtain the symbol combination wins that particular jackpot. In one embodiment, the jackpot value changes depending on the symbol combination displayed in window 5, where the jackpot value is based on the likelihood of obtaining the symbol combination. In another embodiment, the jackpot value accumulates based upon other factors, such as periodically at a fixed rate. Since gaming devices of the rotating reel type (or simulated reel type) predetermine the final outcome based upon a random number generator and then display the symbols selected by the random number generator, the jackpot triggering mechanism may actually dictate to any of the gaming machines in the network to display a winning combination coinciding with the combination shown in window 5 on the jackpot display 1. This will give the illusion to the player that the random outcome of the gaming machine coincided with the symbol combination shown in window 5; however, the timing of the win will be based upon other factors, such as a random time or the number of games played. In this manner, all advantages are still achieved yet the player receives a jackpot based upon more familiar criteria (i.e., obtaining a certain symbol combination).

Additionally, the jackpot symbol combination shown in window 5 may be fixed, or the symbol combination may be displayed on the display glass of the various machines in the network, and the control over a gaming machine by a jackpot mechanism (e.g., computer 17 or control device 19) can dictate to any one of the gaming machines that it is time to display as a final outcome the jackpot combination. In this way, the random number generator internal to the gaming device is essentially overridden by a command from the computer 17 to display the jackpot symbol combination.

In one embodiment, certain triggers for the jackpots are only enabled when there is at least one gaming machine being played.

Figure 3:
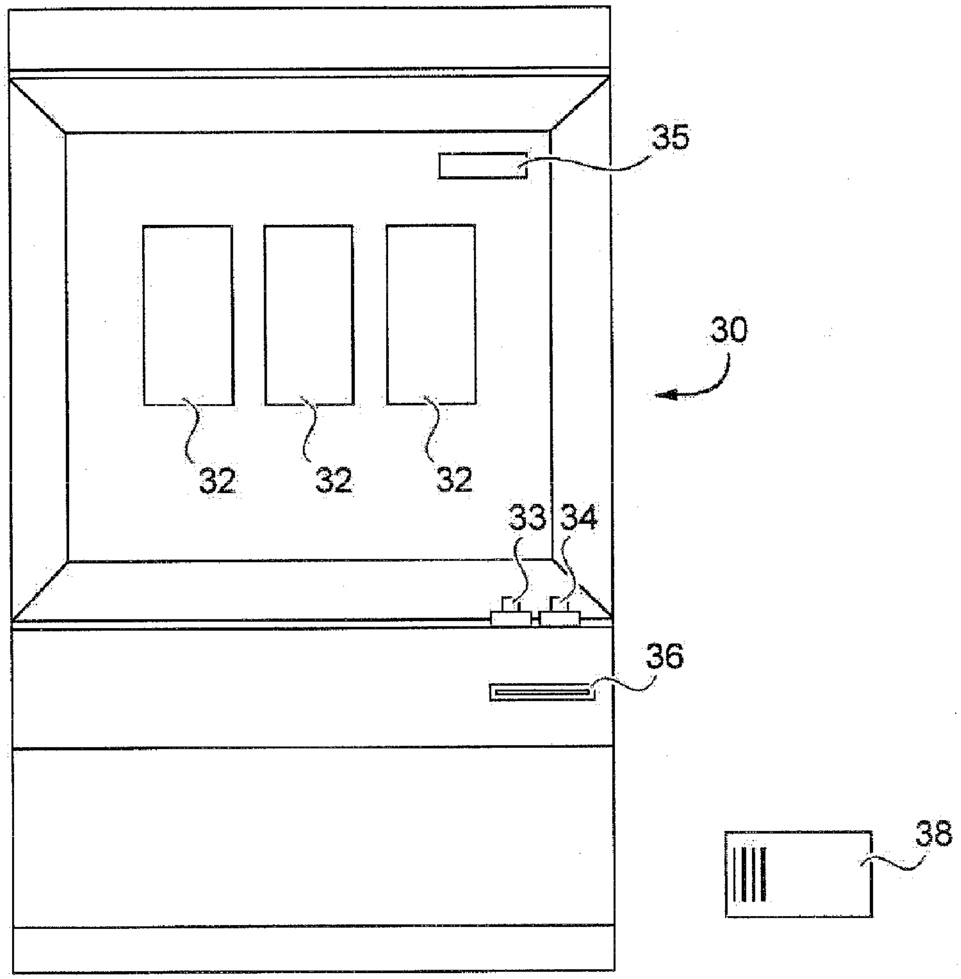
FIG. 3 illustrates a gaming machine connected to a network, where the gaming machine has a slot for insertion of a player ID card.

In another embodiment, the determination of a win of the jackpot is made based upon a code on a player ID card inserted into a gaming machine. FIG. 3 illustrates a gaming machine 30 connected within the network shown in FIG. 2 along with other gaming machines. Gaming machine 30 may be any type of gaming machine for which awards are provided based upon an outcome of symbols on reels 32, symbols displayed on a video screen, or any other game of chance, such as video poker or other game. Machine 30 also includes a start button 33 and a bet button 34. A display screen 35 displays a jackpot or other information. A player ID card 38 is also shown in FIG. 3.

A recent trend in gaming machines is to delete all coin payout mechanisms and provide the players' winnings in the form of a printed ticket, a card having a magnetic strip, or other substitute for cash. The term card and ticket will be used interchangeably. In this way, the gaming machines and the casino personnel do not have to deal with coins. Any printed or magnetic strip card initially issued to a player, or issued by a gaming machine when a player "cashes out" of the machine, may contain a code identifying the player or the card itself. The card may also have encoded on it a monetary amount, or the monetary amount is stored in a central computer and is associated with the player ID code or card code when the player uses the card to initiate play of a gaming machine.

A player inserting the card 38 into a slot 36 in machine 30 has the magnetic strip (or printed bar code) read by a common type of read/write head. The player ID is transmitted to a central server, and the monetary amount is credited to the machine 30. The casino monitors the use of the player ID code to keep track of the particular player's activities. Keeping track of such activities provides valuable information to determine the player's habits, the value of the player to the casino, and better ways to increase the casino's revenues. To motivate players to obtain such player ID cards, the determination of which gaming machine triggers the jackpot may be based upon a random selection by the network (or other device) of a player ID code, such that, once this code is selected and once the player initiates play of a gaming machine using her player ID card (or continues to play a machine after her player ID card was inserted into the machine), that player wins the jackpot. Other techniques of awarding a jackpot to a player based upon the player's ID code are also envisioned. For example, a win of a jackpot may be based upon any player playing a gaming machine using a player ID card within a certain period of time in conjunction with obtaining a certain symbol combination. In one embodiment, the network may detect that a player's ID code entered in a gaming machine matches the selected code for winning the jackpot, and the network computer then controls the gaming machine to display the jackpot symbol combination needed to win the jackpot.

In one embodiment, a player ID code is selected by the network for winning the jackpot; however, to win the jackpot, the player must play a gaming machine within a certain period of time and obtain one or more certain symbol combinations, such as three of a kind. After a period of time, another player ID code is selected for winning the jackpot. In another embodiment, a jackpot may be awarded only if the player using the selected player ID code has played a certain requisite number of games.

The jackpot (or other award) may also be granted to players using player ID cards to play the gaming machines based on other than the ID code itself. For example, the player may be chosen for the award based on the number of plays by the player within a certain period of time, based on the number of points on the player's card, or based on the player's personal characteristics such as a birthday, license number, etc.

The same technique can be used in conjunction with paper cards or tickets that include a printed code identifying the ticket, where the code may be cross-referenced to a monetary amount stored in the network memory. In such a case, it is not the player ID code that is selected for winning the jackpot, but the code printed (or magnetically written) on the paper or plastic ticket. An additional code may be written on the ticket representing the monetary value of the ticket.

Awarding the jackpot based on the player ID code need not require the player to be actively playing a gaming machine. In one embodiment, an ID code is displayed on the jackpot display 1 so even nonactive players can see the winning ID code. The person with the winning ID code can then go to a cashier kiosk to claim the jackpot.

By awarding a jackpot based on the code, players will be motivated to use the player ID cards or use the cash-less gaming machines as opposed to the coin dispenser-type gaming machines. Additionally, by randomly selecting a new code for winning of the jackpot after a certain time period, the players will be motivated to play more often in order to win the jackpot in case their code has been selected.

In the embodiment awarding a jackpot, common to multiple casinos, based on a player ID code, different casinos with different gaming systems can easily install a simple interface that grants a jackpot award based on a player ID code.

In another embodiment, the controlling of a gaming machine by the network computer to display a jackpot symbol combination is not based on any player code or ticket code but is based on a random selection of the gaming machine by the network computer or based on a random time selected by the network computer, where the first gaming machine played after a certain time is controlled by the network computer to display the jackpot symbol combination. This would increase the players' use of the machines.

Accordingly, a gaming system has been described where a common jackpot is not accumulated based upon a percentage of wagers made by the players and where the jackpot is awarded not necessarily based upon the independent outcome of a gaming machine.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A gaming system comprising:

a plurality of gaming machines connected within a network, the gaming machines receiving wagers from players for playing a game, certain outcomes of the game granting awards to the players, each of the gaming machines including a player identification card reader that reads a player identification code on a player identification card used by a player, the player identification code on each player identification card being a unique code that is associated with a player upon issuance of the card to the player that uniquely identifies the particular player or card, a player identification card inserted into the reader being monitored by a casino to track players' activities;

a display device connected to said network that displays a jackpot common to all of said plurality of gaming machines;

a random selector that randomly selects a player identification code from a pool of player identification codes on player identification cards, the pool of player identification codes including player identification codes of players who do not have their player identification card inserted into any gaming machine; and a controller configured to determine whether the jackpot is to be paid to a player of one of said gaming machines based on certain criteria, said certain criteria comprising a matching of a randomly selected player identification code by the random selector with a player identification code on a player identification card inserted by a player into one of said gaming machines, a randomly selected player identification code on the player identification card being different from player identification codes on other player identification cards, the random selector being controlled to select a different player identification code after a certain period of time, the randomly selected player identification code being active for a certain period of time and thereafter being inactive and replaced by the randomly selected different player identification code, wherein when a first player identification code of a first player's player identification card is randomly selected by the random selector for a certain period of time and the first player does not have the first player's player identification card inserted in a gaming machine, the controller is configured to determine that the first player qualifies to win the jackpot, as part of the certain criteria, when the first player inserts the first player's player identification card into a gaming machine within the certain period of time and plays the gaming machine while the random selection of the first player's identification code is still active, prior to a next player identification code being randomly selected by the random selector.

2. The system of claim 1 wherein said certain criteria comprises a random time event.

3. The system of claim 1 wherein said certain criteria comprises a number of plays of said gaming machines.

4. The system of claim 1 wherein said certain criteria comprises a value of said jackpot.

5. The system of claim 1 wherein said certain criteria comprises a certain symbol combination obtained by said one of said gaming machines.

6. The system of claim 1 further comprising a network computer, wherein said matching said code causes said network computer to control said one of said gaming machines to display a jackpot symbol combination.

7. The system of claim 1 wherein said display device is common to more than one of said gaming machines.

8. The system of claim 1 wherein said display device is incorporated into each of said gaming machines.

9. The system of claim 1 wherein said player identification card is a card having a magnetic stripe.

10. The system of claim 1 wherein said player identification card is a card having a printed code.

11. The system of claim 1 further comprising a processor for selecting said code for matching with said code on said player identification card.

12. The system of claim 1 wherein said gaming machines include a slot for inserting said player identification card thereinto.

13. The system of claim 12 wherein said player identification card is used by said player to initiate play of a gaming machine.

14. A method performed by a network of gaming machines, the gaming machines receiving wagers from players to play a game, certain outcomes of the game granting awards to the players, each of the gaming machines including a player identification card reader that reads a player identification code on a player identification card used by a player, the player identification code on each player identification card being a unique code that is associated with a player upon issuance of the card to the player that uniquely identifies the particular player or card, the player identification cards being monitored by a casino to track players' activities, the method comprising:

displaying, by the network of gaming machines, a jackpot common to all of said gaming machines;

reading, by the player identification card reader, a player identification code on any player identification card inserted by players of the network of gaming machines into the card readers of the gaming machines;

randomly selecting, by a random selector in the network of gaming machines, a player identification code from a pool of player identification codes, the pool including player identification codes of players who do not have their player identification card inserted into any gaming machine, a randomly selected player identification code on the player identification card being different from player identification codes on other player identification cards, a randomly selected player identification code being active for a certain period of time and thereafter being inactive and replaced by a randomly selected next player identification code;

determining, by a controller in the network of gaming machines, whether the jackpot is to be paid to a player of one of said gaming machines based on certain criteria, said certain criteria comprising a matching of a randomly selected player identification code with a player identification code on a player identification card inserted by a player into one of said gaming machines, wherein when a first player identification code of a first player's player identification card is randomly selected for a certain period of time and the first player does not have the first player's player identification card inserted in a gaming machine, the first player qualifies to win the jackpot, as part of the certain criteria, when the first player inserts the first player's player identification card into a gaming machine within the certain period of time and plays the gaming machine while the random selection of the first player's identification code is still active, prior to the next player identification code being randomly selected; and awarding the jackpot to a player when the certain criteria is met.

15. The method of claim 14 further comprising displaying said jackpot on a display device.

16. The method of claim 14 wherein said awarding said jackpot is also based on said player playing said gaming machine within a certain period of time.

17. The method of claim 14 wherein said awarding said jackpot is also based on a number of plays of said gaming machine by said player.

18. The method of claim 14 wherein said awarding said jackpot is also based on a value of said jackpot.

19. The method of claim 14 wherein said awarding said jackpot is also based on a certain symbol combination being obtained by said gaming machine.

20. The method of claim 14 wherein said matching said code causes a network computer to control said gaming machine to display a jackpot symbol combination.

21. The method of claim 14 wherein said player identification card is a card having a magnetic stripe.

22. The method of claim 14 wherein said player identification card is a card having a printed code.

23. The method of claim 14 further comprising displaying the identification of the player whose code matched the code that was randomly selected.

* * * * *